(12) United States Patent
Ristock

(10) Patent No.: US 9,538,337 B2
(45) Date of Patent: Jan. 3, 2017

(54) SYSTEM AND METHOD FOR COMMUNICATION SPREAD ACROSS MULTIPLE PHYSICAL LAYER CHANNELS

(75) Inventor: Herbert Ristock, Walnut Creek, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 175 days.

(21) Appl. No.: 13/571,285

(22) Filed: Aug. 9, 2012

(65) Prior Publication Data

US 2014/0043136 A1   Feb. 13, 2014

(51) Int. Cl.

| | |
|---|---|
| G05B 19/00 | (2006.01) |
| G05B 23/00 | (2006.01) |
| G06F 7/00 | (2006.01) |
| G06F 7/04 | (2006.01) |
| G08B 29/00 | (2006.01) |
| G08C 19/00 | (2006.01) |
| H04B 1/00 | (2006.01) |
| H04B 3/00 | (2006.01) |
| H04Q 1/00 | (2006.01) |
| H04Q 9/00 | (2006.01) |
| H04W 4/04 | (2009.01) |
| H04L 29/08 | (2006.01) |
| H04L 29/06 | (2006.01) |
| H04L 5/00 | (2006.01) |

(52) U.S. Cl.
CPC ............ *H04W 4/043* (2013.01); *H04L 63/107* (2013.01); *H04L 63/18* (2013.01); *H04L 67/12* (2013.01); *H04L 69/14* (2013.01); *H04L 5/0091* (2013.01)

(58) Field of Classification Search
CPC ...... G07C 9/00182; G07C 5/008; B60R 25/04
USPC .................... 340/5.1; 375/133, 141; 370/329
See application file for complete search history.

(56) References Cited

U.S. PATENT DOCUMENTS

| | | | |
|---|---|---|---|
| 8,693,520 B2 * | 4/2014 | Kim ..................... | H04B 1/7143 370/329 |
| 2004/0003051 A1 * | 1/2004 | Krzyzanowski et al. | .... 709/217 |
| 2007/0129012 A1 | 6/2007 | Snow | |

(Continued)

OTHER PUBLICATIONS

International Search Report and Written Opinion for PCT/US2013/054018 mailed on Nov. 25, 2013, 15 pages.

(Continued)

*Primary Examiner* — Kerri McNally
*Assistant Examiner* — Anthony D Afrifa-Kyei
(74) *Attorney, Agent, or Firm* — Lewis Roca Rothgerber Christie LLP

(57) ABSTRACT

A system and method for controlling particular communication capabilities of an electronic device located within an electronic communication room (ECR) includes spreading a physical layer of a communication protocol across various (e.g. two) physical communication channels in a coordinated manner. Each physical communication channel is invoked to transmit a different portion of the control signals required for ECR admission. The electronic device is allowed particular communication capabilities if all ECR control signals from all involved physical communication channels are brought together at the device. If an expected control signal from one of the physical communication channels is missing, the particular communication capability fails.

27 Claims, 4 Drawing Sheets

(56) References Cited

U.S. PATENT DOCUMENTS

| | | | |
|---|---|---|---|
| 2008/0285626 A1* | 11/2008 | Claus | H04W 12/06 375/133 |
| 2009/0045970 A1* | 2/2009 | Miyabayashi | G05B 19/042 340/4.3 |
| 2012/0051314 A1* | 3/2012 | Goyal | H04L 9/0833 370/329 |
| 2012/0100806 A1* | 4/2012 | Hall | B60R 25/24 455/41.2 |
| 2012/0274859 A1* | 11/2012 | Knutson | H04L 12/66 348/723 |

OTHER PUBLICATIONS

Faynberg, Igor et al., On Dynamic Access Control in Web 2.0 and Beyond: Trends and Technologies, Bell Labs Technical Journal 16 (2), 2011, pp. 199-218, published by Wiley Periodicals, Inc., published online in Wiley Online Library (wileyonlinelibrary.com), DOI:10.1002/bltj.20511.

* cited by examiner

SYSTEM AND METHOD FOR COMMUNICATION SPREAD ACROSS MULTIPLE PHYSICAL LAYER CHANNELS

FIELD OF THE INVENTION

This invention relates generally to controlling communication of electronic devices, and more particularly, to a system and method for allowing particular communication to and/or from electronic devices when the devices are within a given location.

BACKGROUND OF THE INVENTION

There are often situations when it is desirable to control particular electronic communication to and/or from devices used by people who are present at a discrete (small) location, such as a room or building. The discrete location is hereinafter referred to as an electronic communication room (ECR), and the people within the location who are participating in the electronic communication, are referred to as ECR visitors.

The electronic communication within the ECR may be wireless radio communication or wireline electronic communication. For mobile devices that utilize public wireless networks such as 2G, 3G or 4G, wireless reception by those devices is generally not confined to a given (small) location. Local radio communication such as WiFi is also usually not confined to the given (small) location. For example it is very common for an electronic device to be able to connect to other open local wireless networks in the neighborhood.

One approach used to control electronic communication by a device is to use short-range radio communication such as Near Field Communication (NFC), Bluetooth, or WiFi. These are all radio protocols with protocol-dependent range, and the corresponding geographic area is just defined by the given range. These protocols do not address a situation where the geographic area in which particular electronic communication is to be allowed, is defined by a spatial structure, such as, for example, a room in a building. For example, although access to a local WiFi may be controlled by security mechanisms and explicit registration of authorized users, once registered, the users are able to connect as long as the device is capable of receiving the transmitted radio signals. The range of such reception often transcends the boundaries of a room or other designated space.

One way to control communication of an electronic device while within an ECR is to give the ECR visitors instructions to manually control the electronic device to have certain communication capabilities. For example, ECR visitors may be asked to manually re-configure their electronic communication devices to prevent particular communication of the electronic devices (e.g. manually silencing their phones so that no calls are attended to). ECR visitors may also be provided with a password or URL, and asked to manually type in the password or URL in order to access confidential data. This control mechanism, however, does not control electronic communication once the ECR visitor leaves the ECR location. That is, electronic communication may remain enabled even after leaving the ECR location.

Another option may be to disable radio communication outside of a given location using technologies such as, for example, a Faraday cage/shield. This solution, however, is expensive and has many barriers towards implementation.

Accordingly, what is desired is a system and method for controlling particular communication capabilities of electronic devices within an ECR location, where the ECR may be set up as a permanent or temporary ECR, and may be defined by any spatial boundaries such as a room or building.

SUMMARY OF THE INVENTION

Embodiments of the present invention are directed to a system, apparatus, and method for controlling communication capabilities of an end device within a discrete location. The system includes a first physical communication link, a second physical communication link, and a server communicating with the end device over the first and second physical communications links. The server is configured to transmit a first control signal over the first physical communication link, and transmit a second control signal over the second physical communication link. The second control signal is configured to be confined to the discrete location. The server is further configured to determine whether the end device has received the first and second control signals. In response to determining that the end device has received the first and second control signals, the server enables a particular communication capability of the end device in the discrete location. The particular communication capability is not configured to be enabled on a second end device outside of the discrete location.

According to one embodiment of the invention, the discrete location is a room.

According to one embodiment of the invention, the first control signal is an electronic signal and the second control signal is a non-electronic signal. The electronic signal may be, for example, a radio signal. The non-electronic control signal may be, for example, an acoustic signal.

According to one embodiment of the invention, the enabling of the particular communication capability is enabling an operational mode of the end device, or enabling access to an electronic resource.

According to one embodiment of the invention, the server is configured to transmit to the end device over the second physical communication channel, a second signal associated with a key for accessing the electronic resource. The server receives over the first physical communication channel a request for the electronic resource from the end device. The request includes the key. The server transmits the electronic resource to the end device over the first physical communication channel in response to receipt of the request including the key.

According to one embodiment of the invention, the server sets a status of the end device as visitor to the discrete location in response to determining that the end device has received the first and second control signals. The server then determines that the status of the end device as visitor should be terminated, and disables the particular communication capability of the end device in response to determining that the status of the end device as visitor should be terminated.

According to one embodiment of the invention, the server transmits a third control signal over a third physical communication channel, and a second end device receives the first and third control signals over the first and third physical communication channels. Receipt of the first and third control signals over the first and third physical communication channels enables a different level of communication capability than receipt of the first and second control signals over the first and second physical communication channels.

According to one embodiment of the invention, the server transmits a third control signal over a third physical communication channel, and a second end device receives the first, second, and third control signals over the first, second, and third physical communication channels. Receipt of the first, second, and third control signals over the first, second, and third physical communication channels enables a different level of communication capability than receipt of only the first and second control signals over the first and second physical communication channels According to one embodiment of the invention, the server identifies the first and second physical communication channels from a plurality of physical communication channels based on reception capabilities of the end device.

According to one embodiment of the invention, payload data is transmitted over the first or second physical communication channels.

According to one embodiment of the invention, the first and second physical communication channels are different instances of a same type of channel.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

Figure 1:
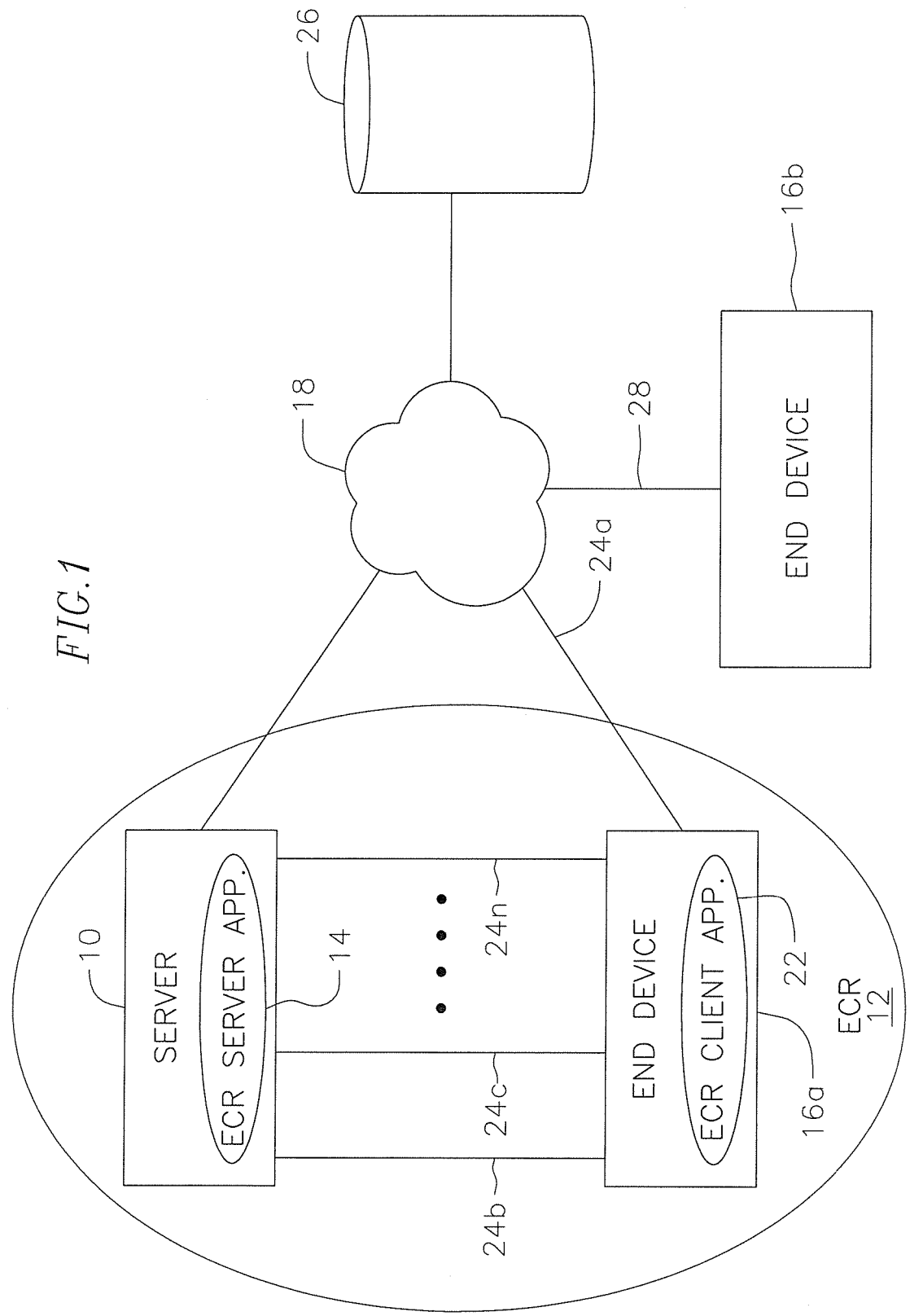
FIG. 1 is a schematic block diagram of a system for managing communication capabilities of electronic end devices according to one embodiment of the invention.

In general terms, embodiments of the present invention are directed to controlling particular communication capabilities of an electronic device located within an ECR. The communication capabilities may be the ability to send and/or receive particular data. For example, certain ECRs (e.g. movie theatres, hospitals, airplanes, etc.) may have rules in regards to use of electronic devices while within the ECR. Such rules may require the powering-off of an electronic device, disabling voice communication, switching communication modes/settings of the electronic device, and the like. Electronic devices entering such ECRs may thus be controlled to automatically change the operational mode of the electronic device to comply with the rules of the ECR. As the devices leave the ECR, however, the devices may be automatically controlled to restore their normal operational mode.

In other examples, the data that may be transmitted to electronic devices within the ECR may be confidential documents for people attending a confidential meeting, teaching materials for students attending a class, subtext/translation of a movie for people inside a movie theatre, and the like. The electronic devices within the ECR may be provided with the necessary keys, codes, addresses, and the like, to access the information using the electronic device. Such resources may have an expiration time coinciding with a time in which the ECR visitors are expected to leave the ECR, to prevent access to the resources once outside of the ECR.

In order to control particular communication capabilities of electronic devices within the ECR, embodiments of the present invention spread a physical layer of a communication protocol across various (e.g. two) physical communication channels in a coordinated manner. Each physical communication channel is invoked to transmit a different portion of the control signals required for ECR admission. The electronic device is allowed particular communication capabilities if all ECR control signals from all involved physical communication channels are brought together at the device. The device may be, for example, a smart phone, laptop, or other portable communications device. If an expected control signal from one of the physical communication channels is missing, the particular communication capability fails. In this regard, reachability of the electronic device is physically limited to the intersection of the ranges of all involved physical transmission channels.

According to one embodiment, the ECR may be configured as an open or closed/private ECR. In case of an open ECR, an end device may dynamically join the open ECR and become an ECR visitor by merely entering the ECR location and receiving all the necessary control signals from all physical communication channels. Devices outside of the ECR are automatically denied ECR visitor status, even if capable of receiving a portion of the control signals transmitted by some of the involved physical communication channels.

In case of a closed ECR, users who enter the ECR receive all the necessary control signals from all physical communication channels as if entering an open ECR. However, unlike an open ECR, the users must be authenticated in order to be granted ECR visitor status. Users who cannot be authenticated are denied ECR visitor status. For example, a closed ECR may be a company with BYOD (bring your own device) policy where employees may be allowed to use their private ICT electronic devices (e.g. smart phones, laptops, etc.) at work. When arriving at their office location, the users may become ECR visitors of the closed work ECR upon authentication of the users. Each electronic device used by an authenticated ECR visitor may then be controlled to automatically enable a work profile, or to set the work profile as a primary profile while the private profile becomes secondary. When leaving the work ECR, the electronic device may be controlled to automatically switch back to private mode, and the work profile may be either disabled or become secondary.

FIG. 1 is a schematic block diagram of a system for managing communication capabilities of electronic end devices according to one embodiment of the invention. The system includes a server 10 configured to control entry, exit, and communication within an ECR 12. End devices within the ECR 12 (hereinafter referred to ECR end devices 16a) are enabled for particular communication capabilities while within the ECR 12. No such enabling, however, is exercised for devices outside of the ECR 12 (hereinafter referred to as non-ECR end devices 16b).

The ECR may be, for example, a single room, a plurality of rooms, a building, a plane, or other discrete location having spatial boundaries. The ECR may be associated with an ECR type that identifies the ECR as open or closed. An open ECR allows end devices to join the ECR and become an ECR visitor by entering the location and receiving the necessary control signals from the server 10. Leaving the location implies leaving the ECR and causes loss of status of an ECR visitor. Non-ECR end devices 16b outside of the location are refrained from being granted ECR visitor status, even if they are capable of receiving some of the control signals transmitted by the server 10 (e.g. via a wireless communication medium).

In the case of a closed ECR, the joining and leaving of the ECR is the same as in an open ECR, but people joining the ECR need to be registered users before being allowed to join. Thus, during the entry phase, the ECR server 10 engages in additional access control checking, and only persons with required credentials are granted access. A given ECR may also be configured to serve both unregistered (open ECR) and registered (closed ECR) users, where registered users may be granted additional permissions such as access to particular services and/or data that is unavailable to non-registered users.

The server 10 communicates with the ECR end devices 16a over two or more physical communication channels 24a-24n (collectively referenced as 24). Two or more of the physical communication channels are utilized to transmit ECR control signals to the ECR end devices for granting ECR visitor status. According to one embodiment of the invention, the ECR end devices utilize the OSI (Open Systems Interconnection) model of network communication. According to this embodiment, at least two or more distinct physical layer instances are present in the same communication session. However, the separation could be also across higher OSI layers. According to this latter embodiment, the application logic could be responsible for managing coordination of transmissions via individual channels.

According to one embodiment, the server 10 includes an ECR server application 14 configured to manage the entry and exit of the ECR end devices to and from the ECR. The ECR server application 14 is further configured to control specific communication capabilities of the ECR end devices while within the ECR.

Each ECR end device 16a includes an ECR client application 22 for receiving and processing ECR control signals transmitted by the server 10. The ECR client application 22 may be pre-installed in the end devices during manufacturing of the end devices. According to one embodiment, the ECR application is an extension of an existing application on the end device, such as, for example, a WLAN client application. The ECR client application may also be downloaded to the end device as a separate application (e.g. an applet).

According to one embodiment of the invention, the ECR end devices 16a that are granted ECR visitor status by the ECR server 10 are given particular communication capabilities while within the ECR. Such communication capabilities may be for receiving resources such as services, data, and the like. For example, the ECR end device 16a may be given access to a data communications network 18 to retrieve data stored in a mass storage device 26. Such electronic communication may be disabled for a non-ECR end device 16b that is outside of the ECR.

The ECR end device 16a may also be controlled for changing certain communication settings of the device upon being granted ECR visitor status. For example, if the ECR is a movie screening room, the ECR server application 14 may communicate with the ECR end device in the movie screening room to switch a ringer setting or another alert mode of the device to vibrate, to deactivate the voice channel (to disallow calls while within the room) but keep the data channel open (to allow texting), or the like. A profile of the ECR end device may also be activated or deactivated upon entry of the ECR. The profile may control the communication settings of the end device. The profile may revert back to what it was prior to entry of the ECR when the end device exits the ECR.

According to one embodiment, the data communication network 18 is a network or combination of networks spanning any geographical area, such as a local area network, wide area network, regional network, national network, and/or global network. The Internet is an example of a current global computer network. The communication network may be a hardwire network, wireless network, or a combination of hardwire and wireless networks.

Hardwire networks may include, for example, fiber optic lines, cable lines, ISDN lines, copper lines, and the like. Wireless networks may include, for example, cellular systems, personal communications service (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

According to one embodiment of the invention, the physical communication channels 24 used to transmit ECR control signals include a non-electronic signal channel 24b and an electronic communication channel 24a. A person of skill in the art should recognize that there may be more than two physical communication channels. For example, there may be multiple electronic and/or non-electronic channels, or multiple instances of a particular type of physical communication channel (e.g. multiple instances of an audio channel). Also, the type of physical communication channels utilized may vary, and is not limited to electronic and non-electronic channels. The determination of which channels to use to communicate with a particular ECR end device may depend, for example, on communication capabilities of the particular ECR end device, and/or the type of access to provide to the particular ECR end device. For example, the ECR end device may be located in a part of the ECR with limited reception capabilities for one physical communications channel, but improved reception capabilities for another physical communications channel. Any of various well known mechanisms may be employed to determine the reception capability of an end device.

Regardless of the type or number of channels utilized, each channel transmits the appropriate ECR control signal in a coordinated manner. When the end device receives all the ECR control signals transmitted by the expected physical communications channels, the end device is granted ECR visitor status, either immediately or after authentication, depending on the type of ECR.

According to one embodiment, the electronic communication channel 24a may be a bi-directional media channel configured to carry payload data for communications occurring within the ECR. Any wireless or wired bi-directional communication channel used for connecting to the data communications network 18 may be referred to as an electronic communication channel 24a. The non-ECR end device 16b may also be coupled to the data communications network 18 over an electronic communication channel 28. Thus, the non-ECR end device may receive, via its electronic communication channel, a portion of the control signals received by the ECR end-device 16a via the electronic communication channel 24a. However, since the non-ECR end device does not receive control signals transmitted by the non-electronic signal channel 24b by virtue of being outside of the structural boundaries of the ECR, the non-ECR end device is not granted ECR visitor status.

According to one embodiment, the non-electronic signal channel 24b is a one-directional channel used for ECR admission control, but there can be also exceptions. According to one embodiment, the non-electronic signal channel may include any channel other than an electronic communication channel used for connecting to the data communications network 18. Although the channel is referred to as a non-electronic signal channel 24b, a person of skill in the art should recognize that the channel may nonetheless invoke certain electronic components.

In case of simple ECR deployments, the non-electronic channel might, during admission of the end device, carry (fully or partially) the actual ECR instructions for ECR visitors. For example, the non-electronic channel may carry instructions to silence the ECR end device (e.g. for a conference or movie screening), deactivate radio transmission of the ECR end device (e.g. in an airplane), or the like. The non-electronic channel may also carry additional data (e.g. in a shop or transport station/terminal) such as, for example, a URL of a website were particular information is available. According to one embodiment, the additional data is configured to be accessible to only certain groups of users, such as, for example, holders of loyalty cards. In this regard, the additional data may be retrieved upon providing a loyalty card membership number.

The media type of the non-electronic signal is chosen in a way that its physical transmission characteristics match the specifics of a given target ECR operation. According to one embodiment, the non-electronic channel complements the electronic channel for admission control and, in some instances, for achieving certain functionalities within the ECR. For example, chunks of the ECR control signals may be transmitted in an alternating manner through the non-electronic and electronic channels with proper timing during an ECR entry phase. In other examples, the non-electronic channel may be used for allowing a subset of a particular functionality during an ECR application phase, but the entire function may only be achieved when both channels are used.

According to one embodiment of the invention, the non-electronic media channel 24b is an analog audio channel. As opposed to (mid or long range) radio signals, acoustic waves are well shielded by walls and cannot generally be received outside of a room/building. When such acoustic waves are used as the non-electronic signal, the reception range of the audio signal defines the spatial boundaries of the ECR. That is, the acoustic signal that is transmitted is configured to be received by an end device within the spatial boundaries of the ECR, but blocked from reception by end devices outside of the ECR due to walls and other physical barriers obstructing the travel of such signals outside of the room. In order to reduce the distraction/annoyance level imposed on ECR visitors due to the audio control signals, the selected audio frequency for the ECR control signal to be transmitted via the audio channel lies at the edge of a frequency range of an audio signal receiver. Those frequencies are likely to be outside of the range that would be audible for most of the ECR visitors.

According to another embodiment of the invention, the non-electronic media channel is a medium configured to transmit a light signal, and includes a light source at the ECR server (or at a separate device coupled to the ECR server). The physical barriers that define the ECR act to confine the light signal to be within the ECR.

According to another embodiment of the invention, the non-electronic media channel is a channel configured to transmit a displayed graphic (such as QR code) which is exposed only to persons currently physically present in the ECR. The non-electronic media channel according to this embodiment may include, for example, a projector coupled to the ECR server. A user may be prompted to take a picture of the displayed graphic and transmit the picture to the server 10 via, for example, email, SMS, instant message, and the like. In this regard, a camera installed in the ECR end device receives the graphic transmitted by the server via the non-electronic media channel. This operation might have to be repeated periodically while the end device is within the ECR.

According to one embodiment of the invention, the end devices 16, 16b are mobile phones, electronic tablets, laptops, or any other mobile communication devices conventional in the art. Each of the server 10 and end devices 16, 16b includes a central processing unit (CPU) for executing software instructions and interacting with other system components for performing the functions described herein. The server 10 and end devices 16, 16b further include a mass storage device such as, for example, a hard disk drive or drive array, for storing various applications and data used for implementing the system. The server 10 and end devices 14 further include an addressable memory for storing software instructions to be executed by the CPU. In this regard, the ECR server and client applications are implemented via computer program instructions which are stored in memory for executing by the CPU of respectively the server and ECR end devices. A person of skill in the art should recognize, however, that all or a portion of the ECR server and client applications may be implemented via firmware, hardware, or a combination of software, firmware, and/or hardware.

The server and end devices further include various input and output units conventional in the art. For example, each end device may include a microphone for audio reception, a camera for graphics reception, and the like. The server may include a speaker for audio transmission, a light source for transmitting a light signal, and the like. In other embodiments, the device generating the non-electronic signal may be separate from the server. For example, the audio emitting and/or light emitting units may be collocated with or directly bundled with a WLAN router, Femto cell, or other device, and controlled by the ECR server application 14 for coordinating paired operation of both the electronic and non-electronic channels. In some embodiments, the speaker function of the end device is invoked by the ECR server application 14. The server and end devices may further include a wired or wireless data communication link for accessing the data communications network 18 via one or more physical communication channels 24.

Figure 2:
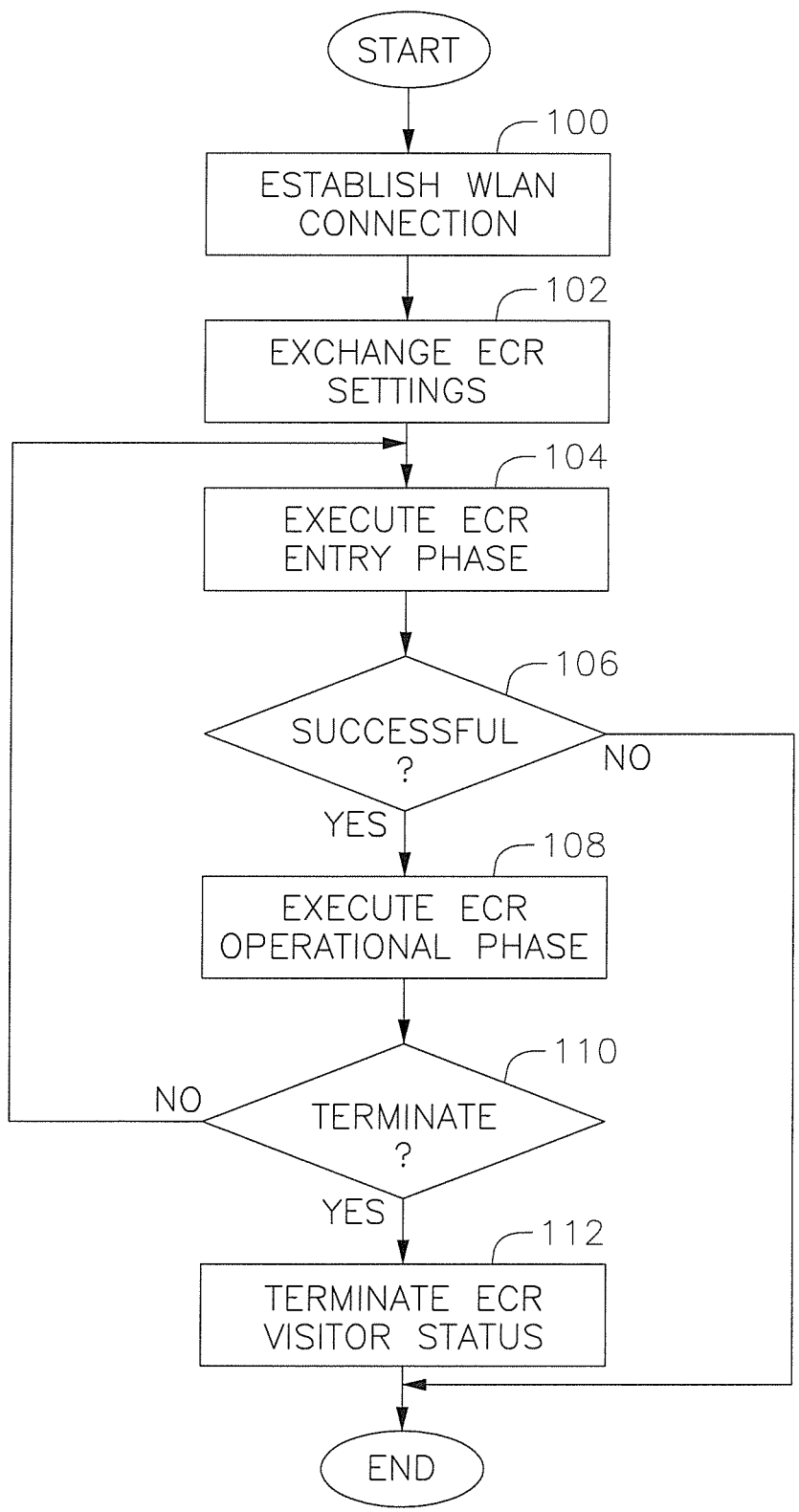
FIG. 2 is a flow diagram of a process for controlling electronic communication of an end device according to one embodiment of the invention.

FIG. 2 is a flow diagram of a process for controlling electronic communication of an end device 16 according to one embodiment of the invention. In step 100, the end device 16 enters an ECR 12 and establishes connection to the data communications network 18 via one or more of the electronic communication channels 24a, such as, for example, a radio channel, according to conventional mechanisms. According to one embodiment, the connection that is established is a wireless local area network (WLAN) connection via the radio channel.

In step 102, the ECR server application 14 communicates with the ECR client application 22 to exchange ECR settings. In this regard, the ECR server transmits over the WLAN connection, information on the type of ECR (e.g. open, private, hybrid, other) and information about the paired non-electronic communication channel. For example, for an audio channel, the information that is transmitted includes a frequency range, pairing keys, timing, audio network ID, admission, and other information that specifies the physical characteristics of the audio channel in order to establish a connection via the channel, and/or information needed for admission control. For example, in the scenario where there are multiple ECR deployments in parallel at the same location, each ECR may have its own specific audio frequency range in order to limit interference.

Once connection is established via the electronic communication channel 24a, the ECR server and client applications, in step 104, enter an ECR entry phase. During the ECR entry phase, certain paired electronic and non-electronic signals are transmitted by the ECR server application 14 for registering the end device 16a as an ECR visitor. According to one embodiment, this includes setting an ECR visitor status flag for the particular ECR end device.

Although non-ECR end devices 16b outside of the ECR may receive the same electronic signals by virtue of being connected to the data communications network over the electronic communication channel 28, they are not granted ECR visitor status since non-ECR end devices 16b are outside of the physical boundaries of the ECR and hence, do not receive the ECR control signals transmitted over the non-electronic channel.

In step 106 a determination is made as to whether the ECR entry phase is successful. If the answer is YES, the end device is deemed to be present in the ECR and the ECR server and client applications 14, 22 enter an ECR operational phase in step 108. During the operational phase, the ECR server and/or client applications determine whether the end device has been granted ECR visitor status prior to executing an ECR operation. Furthermore, depending on the usage scenario, the communication between ECR server and client application may be one way (e.g. for triggering adjustment of device settings for visitors of a passive ECR), or bidirectional, where the ECR client is registered as an ECR visitor and a dedicated ECR session is opened upon granting access to protected information. In this regard, a dedicated audio signal may be used to transmit a key/token (or part of it) that is required for admission control to information offered/transmitted by a paired subsequent electronic message. For example, the audio signal associated with the key/token may be frequency modulated, similar to frequencies associated with DTMF tones. In another embodiment, the key/token may be transmitted as a series of on-off tones such as in Morse code transmission. The audio signal may then be converted into an electronic format within the receiving device for obtaining an electronic key/token.

According to one embodiment, audio and/or electronic signals may be transmitted during the operational phase for actual execution of a desired operation (e.g. changing an alert mode of the end device to vibrate). The audio and/or electronic signals may further be used to communicate input parameters to certain operations. For example, a URL address or additional secret keys may be transmitted via the non-electronic signal channel during the operational phase for accessing specific documents while within the ECR.

In step 110, a determination is made as to whether the ECR visitor status of the ECR end device should be terminated. If the answer is YES, the ECR visitor status is terminated in step 112, and the ECR visitor flag that is set of the ECR end device is unset. On termination, the server or client ECR application may optionally restore settings of the ECR end device that were changed for the duration of the ECR visit. For example, the alert mode of the ECR end device could be switched back to normal when the visitor leaves the ECR and loses ECR visitor status.

According to one embodiment of the invention, the determination as to whether the ECR visitor status of the end device 16a should be terminated depends on results from periodic ECR entry renewals. For example, the ECR server application 14 may be configured to periodically execute the ECR entry phase 104 (e.g. every 10 minutes) to check whether the ECR end device is still within the ECR, and hence, still connected with the ECR server 10 over the non-electronic signal channel 24b.

According to another embodiment, the re-executing of the ECR entry phase is based on a time out logic. In this regard, the ECR server application 14 monitors an entry time of the ECR end device 16a into the ECR. If the entry time reaches a preset expiration time, an assumption is made that the ECR end device has exited the ECR 12. This may be appropriate for ECRs that are operated permanently or for longer duration of time, where visitors only join the ECR temporarily, such as, for example, a screening room in a movie theatre, a hospital, an airplane, or the like. The assumption that the ECR end device has left the ECR may be confirmed upon an unsuccessful execution of the ECR entry phase after the preset expiration time.

Alternatively, if the entry time reaches the preset expiration time, the ECR server application 14 may be configured to transmit an explicit ECR exit message to the ECR client application 22, such as, for example, upon conclusion of a confidential meeting held in the ECR. According to one embodiment, all or portions of the ECR exit message is transmitted over the electronic and/or non-electronic channels 24a, 24b. Upon receipt of the message, the ECR client application 22 terminates the ECR visitor session. For example, the ECR client application 22 may terminate the electronic communication 24a with the server 10. The ECR exit message may include other exit instructions such as, for example, instructions to reset a profile, a mode, or other setting of the end device.

According to another embodiment, the ECR includes separate physical entries and exits, and respective ECR entry and exit control signals are emitted just at those locations, respectively. The server ECR application may have a forced timeout routine, for example, to handle failure situations when an exit signal is not received after a preset amount of time after receiving an entry signal.

Figure 3:
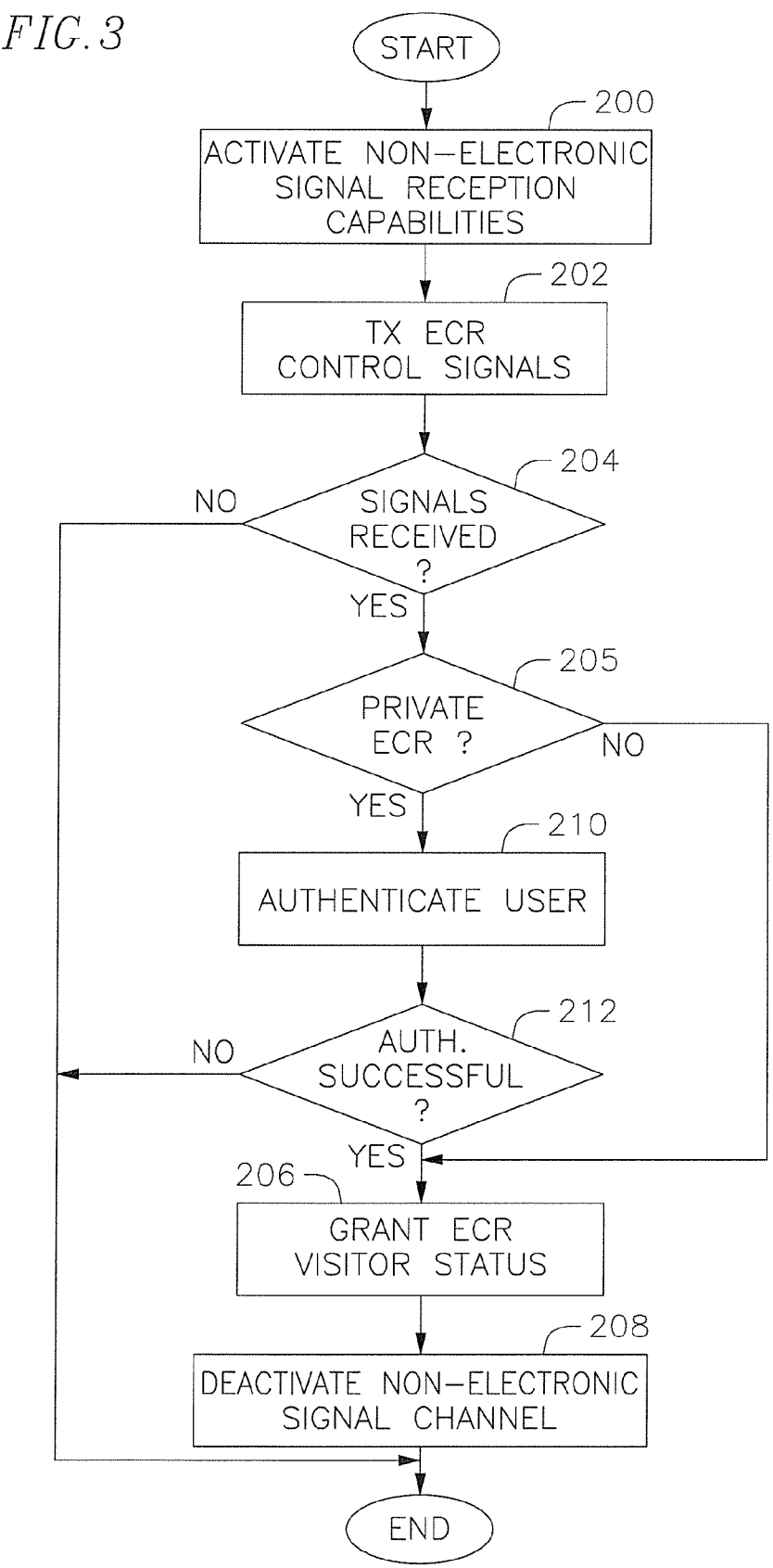
FIG. 3 is a flow diagram of an ECR entry phase according to one embodiment of the invention.

FIG. 3 is a flow diagram of the ECR entry phase of step 104 according to one embodiment of the invention. In step 200, the ECR server application 14 activates the non-electronic signal reception capabilities of the ECR end device 16a based on the received ECR setting information. In this regard, the ECR server application 14 transmits a trigger signal to the connected ECR end device via the electronic communication channel 24a. In response to receipt of the trigger signal, the ECR client application 22 temporarily activates the non-electronic signal reception application and associated interface(s) of the ECR end device. For example, the ECR client application may temporarily activate a built-in microphone and an audio reception application of the end device.

Upon triggering activation of the non-electronic signal reception capabilities of the ECR end device, the ECR server application 14, in step 202, transmits one or more ECR control signals according to a preset signaling sequence stored in the memory of the server 10. The control signals include electronic and/or non-electronic control signals transmitted over the electronic and/or non-electronic communication channels 24a, 24b. In this regard, the ECR server application 14 invokes its non-electronic signal emission capabilities, such as, for example, a loudspeaker and an audio signal generator application. When the non-electronic control signal(s) are paired with one or more electronic control signals, the particular sequence and timing of the non-electronic and electronic control signals depend on a preset signaling sequence. For example, every dedicated audio signal may be interleaved with a dedicated electronic signal. Other sequences will be apparent to a person of skill in the art. The electronic and non-electronic control signals may further be paired based on an identifier transmitted with each signal for allowing the ECR client application to match the signals transmitted via the different physical channels to each other.

In step 204, a determination is made as to whether all expected ECR control signals have been received by the client ECR application according to the preset signaling sequence. As a person of skill in the art will understand, the non-electronic control signals transmitted via the non-electronic channel 24b are configured to be confined within the ECR as the structure forming the ECR blocks the non-electronic channel from traveling outside of the ECR. Hence, the end device outside of the ECR 12 does not receive the non-electronic control signals although the paired electronic control signals might reach such an end device.

If the end device does not receive all expected electronic and non-electronic control signals, the process ends without the end device being granted ECR visitor status. However, if the end device receives all expected ECR control signals, the ECR client application transmits an acknowledgment back to the ECR server application. The acknowledgment is used as an indication that the end device has received the ECR control signals from all expected physical channels and hence, is present in the ECR.

In step 205, a determination is made as to whether the ECR to be accessed is a closed/private ECR. A closed ECR requires authentication of the a user while an open ECR does not. If the ECR is a closed ECR, the ECR server application 14, in step 210, engages in authenticating the user of the ECR end device 16a. The authentication process may include the receipt and verification of a user ID and/or password, or any other conventional authentication mechanism conventional in the art. If the authentication is successful, as is determined in step 212, the ECR end device is granted ECR visitor status in step 206.

If the ECR is an open ECR, the end device is granted ECR visitor status upon successful receipt of the ECR control signals without any need for authentication.

In granting ECR visitor status to an end device, the ECR server application registers the ECR end device as an ECR visitor. This may entail storing an ECR visitor flag in association with an identifier for the particular ECR end device, storing an entry time to the ECR, and the like.

Upon completion of the ECR entry phase, the ECR client application deactivates the non-electronic signal channel 24b in step 208. The deactivation may be automatically performed by the ECR client application upon detecting that all expected control signals have been received. In another embodiment, the ECR server application 14 may be configured to transmit a timeout signal to the ECR client application for deactivating the non-electronic signal channel. The activating of the non-electronic channel upon initiation of the ECR entry phase, and the deactivating of the non-electronic channel upon completing of the ECR entry phase, allows the minimizing of the power drain of the end device.

According to one embodiment, all or a portion of the ECR entry phase is re-executed at periodic intervals (e.g. every 1 minute) to verify whether the end device is still present in the ECR. If the ECR is a private ECR, a user of the end-device need not be re-authenticated during the re-execution of the entry phase. Instead, the ECR server application 14 merely checks at the periodic intervals whether the end device has received all the ECR control signals transmitted in all involved physical communication channels.

Figure 4:
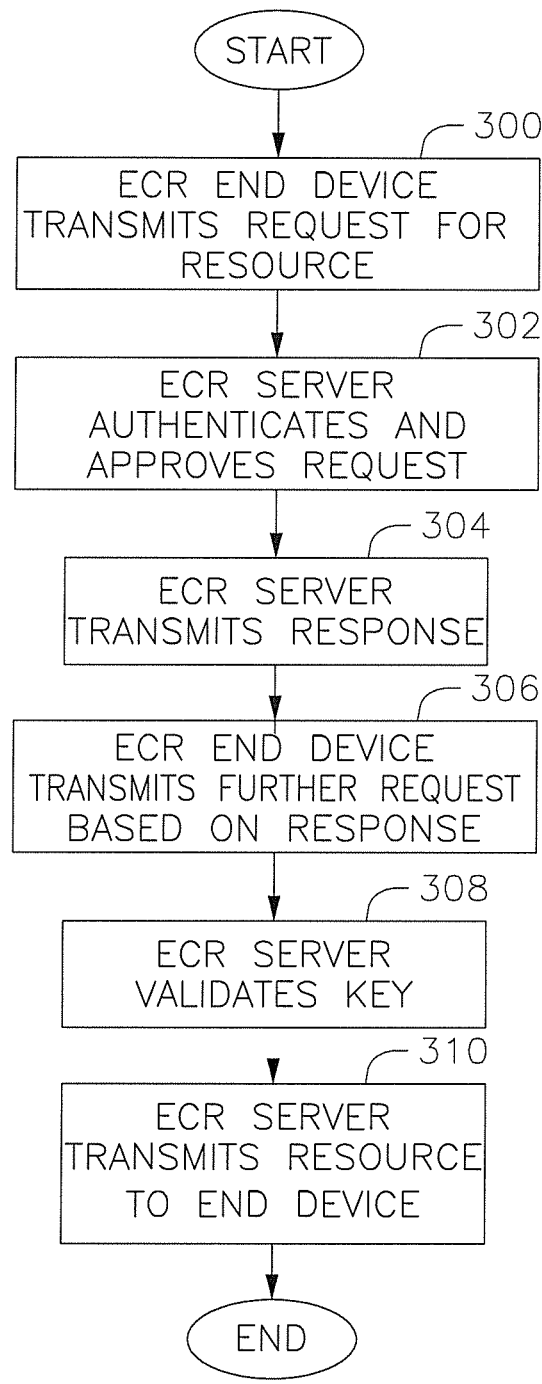
FIG. 4 is a flow diagram of an ECR operational phase according to one embodiment of the invention.

FIG. 4 is a flow diagram of the ECR operational phase 108 (FIG. 2) according to one embodiment of the invention. The process starts, and in step 300, the ECR end device transmits a request for a particular resource, such as for example, a particular document, via the electronic communication channel 24a. The request may include parameters for identifying the request, the end device, the resource to be accessed, and the like.

In step 302, the ECR server 10 engages in authentication and approval of the request. For example, the ECR server may determine that the particular end device has the status of an ECR visitor, and that the request is a valid request.

In step 304, the ECR server 10 transmits a response to the ECR client 22 over the non-electronic communication channel 24b configured to be reachable to only the end devices within the ECR. The response may provide credentials for accessing the requested resource. For example, the response may identify the particular request that is being responded to, a pointer to the resource, an access key or token, and the like. According to one embodiment, the non-electronic signal that corresponds to the access key or token is converted into an electronic key or token.

In step 306, the ECR end device transmits a further request to the ECR server to get the resource using the credentials information received from the ECR server. For example, the ECR end device may transmit a command that identifies the original request, the end device, the pointer to the resource, and the electronic key or token for accessing the resource.

In step 308, the ECR server 10 validates the access key transmitted in the request, and in step 310, transmits the requested resource to the ECR end device over the electronic data communications network 24a. According to one embodiment, the resource is viewed without downloading. For example, a link may be provided for viewing the resource, and the user may be instructed to actuate the link each time that he or she wishes to view the resource. The link may be disabled once the end device loses ECR visitor status.

According to another embodiment, the requested resource may be downloaded to the ECR end device but have associated with it an expiration time. The expiration time may be selected to coincide with the time at which the ECR end device is expected to leave the ECR (e.g. the end of a conference, meeting, movie, etc.). When the resource expires, the ECR end device is no longer allowed to access the resource.

The processes of FIGS. 2-4 may be described in terms of a software routine executed by the corresponding CPU based on instructions stored in memory. A person of skill in the art should recognize, however, that the processes may be executed via hardware, firmware (e.g. via an ASIC), or in any combination of software, firmware, and/or hardware. Furthermore, the sequence of steps of the processes are not fixed, but can be altered into any desired sequence as recognized by a person of skill in the art.

In the embodiment where multiple physical communication channels are available for use to transmit control and/or payload data, the server 10 may be configured to select all or a subset of those channels for transmitting signals to the ECR end devices 16a. For example, the system may be configured to communicate with a first ECR end device over first and second physical communication channels, while configured to communicate with another ECR end device over first and third physical communication channels. All available communication channels may also be used (e.g. when the highest level of security is required). For example, a device communicating over all channels may be granted a highest level of access to data in the mass storage device 26, while a device communicating over only a subset of the channels would have restricted access. The channels may also be explicitly ranked according to access levels. For example, communicating over channels 1 and 2 may grant full access while communicating over channels 1, 3 and 4 may grant partial access. For example, people with devices at a main table inside a main room of the ECR may have access to data provided while within the ECR, via WiFi and Bluetooth (or other near field communication mechanism) physical communication channels, while people standing in the main room of the ECR may have the same access as those sitting at the table, but via WiFi and light channels, due to the fact that those people standing may not have Bluetooth reception capabilities. People at the table could also receive light signals, but it would not be required since the combination of WiFi and Bluetooth may be deemed to grant full access. People within a different room of the ECR (e.g. an adjacent room) may communicate via WiFi and audio channels, but not Bluetooth or light. The communication via WiFi and audio may be deemed to grant some access, but not the same full access that would be provided by communicating via Bluetooth or light.

It is the applicants intention to cover by claims all such uses of the invention and those changes and modifications which could be made to the embodiments of the invention herein chosen for the purpose of disclosure without departing from the spirit and scope of the invention. For example, although the ECR control signals are described as being transmitted via electronic and non-electronic communication channels, a person of skill in the art should recognize that other types of physical communication channels may be paired for transmitting the ECR control signals. Thus, the present embodiments of the invention should be considered in all respects as illustrative and not restrictive, the scope of the invention to be indicated by the appended claims and their equivalents rather than the foregoing description.

What is claimed is:

1. A method for controlling communication capabilities of an end device within a discrete location, the method comprising:
   detecting, by a processor, connection of the end device over a first communication channel having a first distance range of communication;
   transmitting by the processor, to the end device, over the first communication channel, information on a second communication channel physically different from the first communication channel, for enabling the end device to receive control signals over the second communication channel, wherein the second communication channel has a second distance range of communication;
   transmitting, by the processor, a first control signal over the first communication channel;
   transmitting, by the processor or another device in communication with the processor, a second control signal over the second communication channel, wherein the second control signal is configured to be confined to the discrete location;
   determining, by the processor, whether the end device has received the first and second control signals; and
   in response to determining that the end device has received the first and second control signals, enabling a particular communication capability of the end device in the discrete location where the first and second distance ranges of the first and second communication channels overlap with each other, wherein the particular communication capability is not configured to be enabled on the end device outside of the discrete location where the first and second distance ranges of the first and second communication channels do not overlap with each other.

2. The method of claim 1, wherein the discrete location is a room.

3. The method of claim 1, wherein the first control signal is an electronic signal and the second control signal is a non-electronic signal.

4. The method of claim 3, wherein the electronic signal is a radio signal.

5. The method of claim 3, wherein the non-electronic control signal is an acoustic signal.

6. The method of claim 1, wherein enabling the particular communication capability is enabling an operational mode of the end device.

7. The method of claim 1, wherein enabling the particular communication capability is enabling access to an electronic resource.

8. The method of claim 7 further comprising:
   transmitting to the end device over the second communication channel, a second signal associated with a key for accessing the electronic resource;
   receiving over the first communication channel a request for the electronic resource from the end device, the request including the key; and
   transmitting the electronic resource to the end device over the first communication channel in response to receipt of the request with the key.

9. The method of claim 1 further comprising:
   setting a status of the end device as visitor to the discrete location in response to determining that the end device has received the first and second control signals;
   determining that the status of the end device as visitor should be terminated; and
   disabling the particular communication capability of the end device in response to determining that the status of the end device as visitor should be terminated.

10. A data processing apparatus adapted for controlling communication capabilities of an end device within a discrete location, the server comprising:
   a processor; and
   a memory coupled to the processor and storing program instructions therein, the program instructions being configured to execute the program instructions, the program instructions comprising:
      detecting connection of the end device over a first communication channel having a first distance range of communication;
      transmitting to the end device, over the first communication channel, information on a second communication channel physically different from the first communication channel, for enabling the end device to receive control signals over the second communication channel, wherein the second communication channel has a second distance range of communication;

transmitting a first control signal over the first communication channel;
transmitting a second control signal over the second communication channel, wherein the second control signal is configured to be confined to the discrete location;
determining whether the end device has received the first and second control signals; and
in response to determining that the end device has received the first and second control signals, enabling a particular communication capability of the end device in the discrete location where the first and second distance ranges of the first and second communication channels overlap with each other, wherein the particular communication capability is not configured to be enabled on the end device outside of the discrete location where the first and second distance ranges of the first and second communication channels do not overlap with each other.

11. The data processing apparatus of claim 10, wherein the discrete location is a room.

12. The data processing apparatus of claim 10, wherein the first control signal is an electronic signal and the second control signal is a non-electronic signal.

13. The data processing apparatus of claim 10, wherein the electronic signal is a radio signal.

14. The data processing apparatus of claim 10, wherein the non-electronic control signal is an acoustic signal.

15. The data processing apparatus of claim 10, wherein enabling the particular communication capability is enabling an operational mode of the end device.

16. The data processing apparatus of claim 15, wherein enabling the particular communication capability is enabling access to an electronic resource.

17. The data processing apparatus of claim 16, wherein the program instructions further include:
transmitting to the end device over the second communication channel, a second signal associated with a key for accessing the electronic resource;
receiving over the first communication channel a request for the electronic resource from the end device, the request including the key; and
transmitting the electronic resource to the end device over the first communication channel in response to receipt of the request with the key.

18. The data processing apparatus of claim 10, wherein the program instructions further include:
setting a status of the end device as visitor to the discrete location in response to determining that the end device has received the first and second control signals;
determining that the status of the end device as visitor should be terminated; and
disabling the particular communication capability of the end device in response to determining that the status of the end device as visitor should be terminated.

19. The data processing apparatus of claim 10, wherein the program instructions further comprise:
transmitting a third control signal over a third communication channel, wherein a second end device receives the first and third control signals over the first and third communication channels, wherein receipt of the first and third control signals over the first and third communication channels enables a different level of communication capability than receipt of the first and second control signals over the first and second communication channels.

20. The data processing apparatus of claim 10, wherein the program instructions further comprise:
transmitting a third control signal over a third communication channel, wherein a second end device receives the first, second, and third control signals over the first, second, and third communication channels, wherein receipt of the first, second, and third control signals over the first, second, and third communication channels enables a different level of communication capability than receipt of only the first and second control signals over the first and second communication channels.

21. The data processing apparatus of claim 10, wherein the program instructions further comprise:
identifying the first and second communication channels from a plurality of communication channels based on reception capabilities of the end device.

22. The data processing apparatus of claim 10, wherein payload data is transmitted over the first or second communication channel.

23. The data processing apparatus of claim 10, wherein the first and second physical communication channels are different instances of a same type of channel.

24. A system for controlling communication capabilities of an end device within a discrete location, the system comprising:
a first communication link;
a second communication link physically different from the first communication link;
a server communicating with the end device over the first and second communications links, the server being configured to:
detect connection of the end device over a first communication channel having a first distance range of communication;
transmit to the end device, over the first communication channel, information on a second communication channel physically different from the first communication channel, for enabling the end device to receive control signals over the second communication channel, wherein the second communication channel has a second distance range of communication;
transmit a first control signal over the first communication link;
transmit a second control signal over the second communication link, wherein the second control signal is configured to be confined to the discrete location;
determine whether the end device has received the first and second control signals; and
in response to determining that the end device has received the first and second control signals, enable a particular communication capability of the end device in the discrete location where the first and second distance ranges of the first and second communication channels overlap with each other, wherein the particular communication capability is not configured to be enabled on the end device outside of the discrete location where the first and second distance ranges of the first and second communication channels do not overlap with each other.

25. The method of claim 1, wherein the end device is a portable end device enabled to be moved in and out of the discrete location.

26. The system of claim 24, wherein the information is a characteristic of the second communication channel.

27. The system of claim 26, wherein the characteristic is at least one of a frequency, key, or network ID, for accessing the second communication channel.

\* \* \* \* \*